United States Patent [19]

Link et al.

[11] 4,446,503

[45] May 1, 1984

[54] ELECTRICAL PANELBOARD WITH MAIN BREAKER HOLD-DOWN

[75] Inventors: Donald A. Link, Hubertus; John A. Swessel, Jr., Milwaukee, both of Wis.

[73] Assignee: Eaton Corporation, Cleveland, Ohio

[21] Appl. No.: 338,798

[22] Filed: Jan. 11, 1982

[51] Int. Cl.³ .............................................. H02B 1/02
[52] U.S. Cl. ..................................... 361/346; 361/363
[58] Field of Search ............... 361/346, 347, 350, 351, 361/353, 354, 357, 360, 363, 376, 356, 358, 427; 200/42 R, 42 T, 44; 339/37, 198 N, 82, 91 R

[56] References Cited

U.S. PATENT DOCUMENTS

| | | | |
|---|---|---|---|
| 2,530,548 | 11/1950 | Stanley | 361/363 |
| 2,883,587 | 4/1959 | Dorfman et al. | 361/363 |
| 3,159,771 | 1/1964 | Duvall | 361/363 |
| 3,174,079 | 3/1965 | Koenig | 361/363 |
| 3,218,520 | 11/1965 | Casey | 361/363 |
| 3,258,652 | 6/1966 | Galante et al. | 361/363 |
| 3,611,048 | 10/1971 | Shelvik | 361/361 |

*Primary Examiner*—J. V. Truhe
*Assistant Examiner*—Greg Thompson
*Attorney, Agent, or Firm*—C. H. Grace; L. G. Vande Zande

[57] ABSTRACT

A Z-shaped bracket (42) is secured to a circuit breaker panel (2) by a fastener (44) to project forwardly along a plug-in main circuit breaker (30) and overlie the forward surface of the main breaker to prevent removal of the main breaker (30) without first removing the bracket (42). The bracket and its function are made plainly evident by placement and indicia.

10 Claims, 4 Drawing Figures

ELECTRICAL PANELBOARD WITH MAIN BREAKER HOLD-DOWN

This invention relates to electrical panelboards or load centers which receive electrical power from a transmission source and distribute it through circuit protective devices to branch circuits within a building. It is a commonly accepted practice to provide switch means on the panelboard for disconnecting the panelboard distributive bus bars and the branch circuits from the supply. This switch means is commonly a main circuit breaker which directly receives the incoming supply wires and which connects to the panelboard bus bars to supply electrical power to the remainder of the panelboard. In panelboards of the plug-in type, the electrical connection from the circuit breaker to the bus bar comprises a depending connector element on the bottom or rear side of the breaker which engages a mating element on the bus bar. The connection is completed by attaching one end of the breaker to a supporting rail of the panelboard and pivoting the connector end of the breaker into plug-in engagement with the bus bar connector element.

The use of a plug-in circuit breaker as a main breaker presents certain hazards which an unauthorized person may not be aware of. Inasmuch as the supply wires are directly wired to the breaker, the breaker itself is electrically hot at all times. If the breaker is unplugged from the panelboard while the breaker mechanism is in the ON position, the elements of the plug-in connection are also electrically hot and the separation thereof under power may result in severe arcing or flash which could cause injury to the person removing the breaker. Another potentially dangerous condition can exist if the main circuit breaker is unplugged from the panelboard but remains connected to the incoming supply wires. These wires are sufficiently stiff to flexibly suspend the breaker in mid-air. If the breaker mechanism is in the ON position, the depending plug-in connecting elements are electrically hot and present a shock hazard to a person contacting these connector elements either accidentally or unknowingly. Moreover, the connector elements may be accidentally contacted by a tool or the breaker may be deflected into contact with some part of the panel or housing to cause line-to-line or line-to-ground short circuit arcing.

To guard against the aforementioned conditions occasioned by an unauthorized or unknowing person, there is provided a means of holding a plug-in main breaker in place on a panelboard such that the main breaker may not be removed by a simple unplugging or pull-out motion. The holding means preferably requires the use of a tool to remove the holding means in order to permit the main breaker to be removed from the panel, thereby serving as an indication to the unauthorized person that removal of the main breaker is unique and requires greater consideration than mere unplugging. To accomplish these goals simply and economically, there is provided herein a simple bracket which secures to the panelboard and extends up over the top of the main circuit breaker to hold the breaker in place. The bracket is secured to the panelboard by a screw, or the like, which may be removed by a suitable tool. The overlying portion of the bracket may contain printed indicia of an instructive or warning nature.

The invention will be more fully understood in the following description when read in conjunction with the accompanying drawings wherein.

Figure 1:
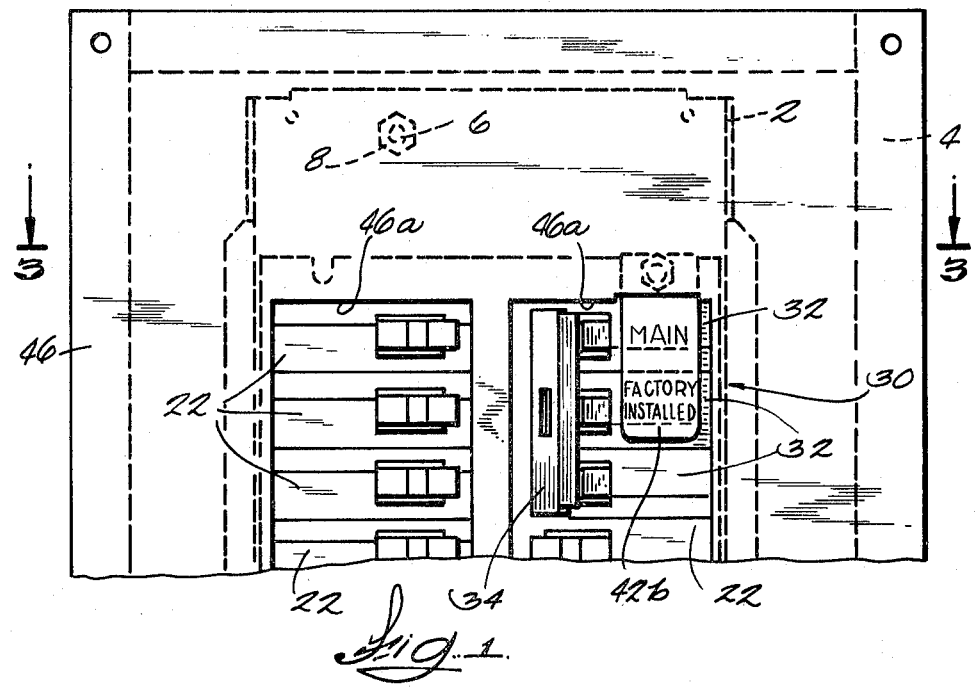
FIG. 1 is a fragmentary front view of a panelboard having a plug-in main circuit breaker.
Figure 2:
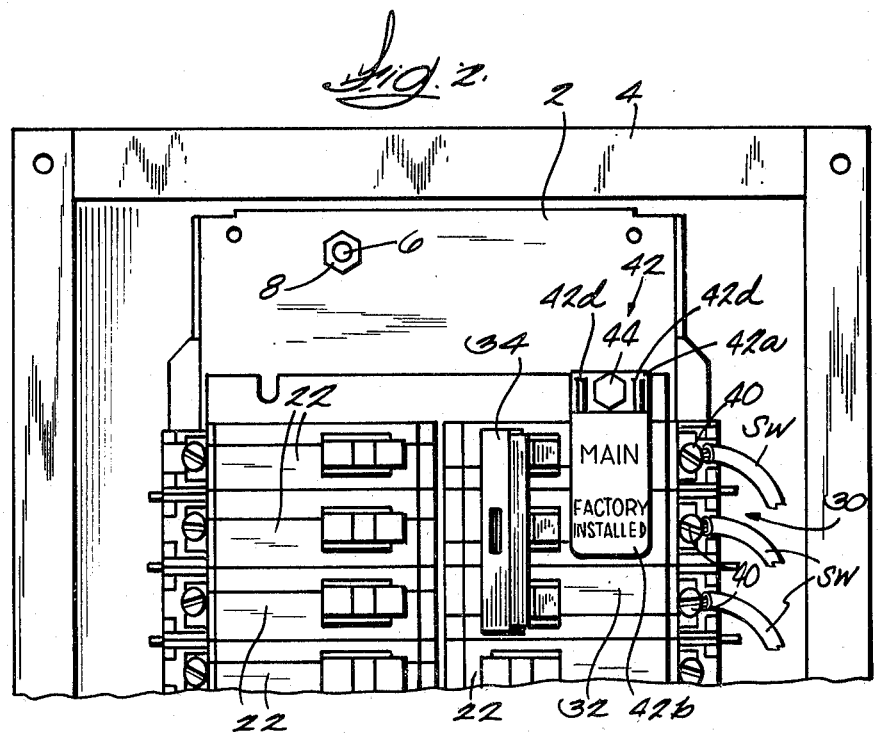
FIG. 2 is a fragmentary front view of the panelboard of FIG. 1 with a coverplate removed.
Figure 4:
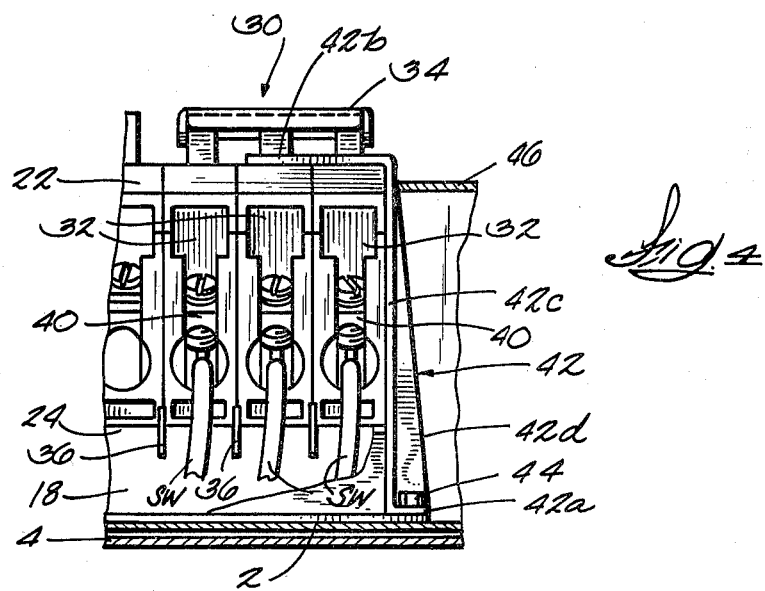
FIG. 4 is a cross-sectional view taken along the line 4—4 of FIG. 3.

Referring to FIGS. 1 and 2 of the drawings, a panelboard comprises a panel 2 mounted in an enclosure 4 by forwardly projecting threaded posts 6 (only one of which is shown) which project through a mounting hole on the panel 2 and receive a nut 8 thereon to secure the panel within the enclosure. The panel 2 is like that disclosed and claimed and U.S. Pat. No. 3,611,048 issued Oct. 5, 1971 to Bertrum S. Shelvik and assigned by mesne assignments to the assignee of the present application. The disclosure of U.S. Pat. No. 3,611,048 is incorporated herein by reference.

Figure 3:
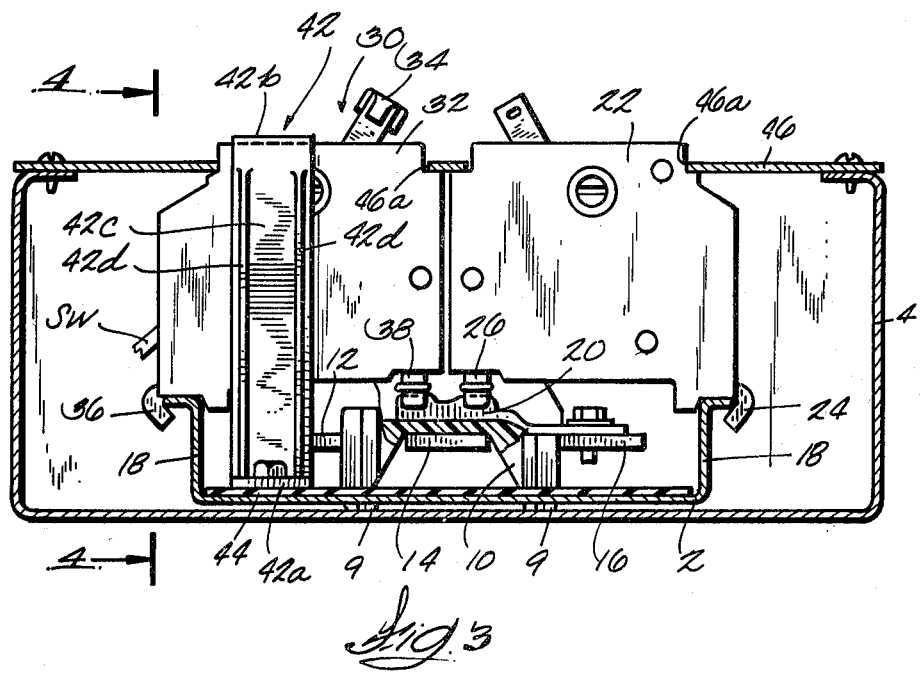
FIG. 3 is a cross-sectional view taken along the line 3—3 of FIG. 1.

Referring also to FIG. 3, the panelboard includes a plurality of insulating mounting members 10 which are secured to the bottom wall of the panel 2 by screws 9. The panelboard illustrated in the drawings is a three-phase unit wherein the supports 10 serve to mount three bus bars 12, 14 and 16 in planes parallel to the bottom wall of the panel 2, but spaced a small distance therefrom. A single-phase panelboard may be similarly constructed, in which case the supports 10 serve to mount only two bus bars. The bus bars extend longitudinally along the length of the panel 2 between the outer edges thereof which are formed into forwardly and outwardly projecting flanges 18 to serve as mounting rails for circuit breakers received by the panelboard. As disclosed in the referenced U.S. Pat. No. 3,611,048, electrical branch connectors 20 are provided on the upper side of the respective bus bars 12, 14 and 16 to overlie the insulating support members 10 and effectively provide a pair of spaced, longitudinally extending rows of plug-in connectors along the center of the panel 2. A plurality of branch circuit breakers 22 are attached to the panel between the plug-in connectors 20 and the respective outer rail 18. Each branch circuit breaker 22 is provided with a hook member 24 at one lower or rear corner thereof and with a plug-in connector 26 at the opposite lower or rear corner thereof. Attachment of the breakers is accomplished by engaging the hook portion with the mounting rail 18 and then pivoting the connector end of the breaker into engagement with the corresponding plug-in connector 20.

A main breaker 30 is provided for the panel to enable the electrical power to the panel to be disconnected through the main breaker switch mechanism. In a conventional manner the main breaker 30 is comprised of two or three single pole breakers 32, physically joined together in a side-by-side relationship and further having their trip mechanisms and handle mechanisms joined together. In the embodiment disclosed a three-pole main breaker 30 is used having a handle tie 34 connected across the handles of the three breakers 32. The main breaker 30 is installed in the same way as branch breakers 22 wherein hooks 36 at the lower or rear corner of each breaker 32 are engaged with the respective mounting rail 18 and the breaker is pivoted to cause plug-in connectors 38 to engage with the respective mating connectors 20 on the panel. In order to serve as a main breaker the incoming supply wires SW are connected to each pole 32 of the main breaker 30 by means of the pressure connector 40 provided on each breaker 32. Thus, incoming power flows through the individual poles of the breaker 30 and into the respective bus bars 12, 14 and 16 by means of the plug-in connection established by elements 20 and 38. With the bus bars thus electrically fed, power is provided through the respective plug-in connectors 26 to each branch circuit breaker 22 and to the various branch circuit wires as may be connected to the pressure connector of each breaker. As mentioned earlier, the main breaker plug-in contacts 38 are electrically live when the breaker 30 is in the ON position and removal of the main breaker under these conditions may cause potentially dangerous arcing at the separation of the plug-in elements or at subsequent contact with a part of the panelboard assembly or with a tool, and further present a shock hazard to the person working on the panelboard.

To prevent the removal of the main breaker 30 by an unauthorized or unknowledgeable worker, a hold-down bracket 42 is provided to secure the main breaker 30 in place on the panel 2 until such bracket is removed. The bracket 42 is a Z-shaped member preferably molded of an insulating material although other constructions such as a metal bracket could also be used. The bracket 42 has a lower horizontally extending mounting foot 42a and an upper horizontally extending leg 42b which projects over an upper or forward surface of at least two poles of the main circuit breaker 30. An upstanding leg 42c joining the horizontal legs has a pair of strengthening ribs 42d formed thereon. The front face of the upper horizontal leg 42b may be provided with suitable informational or warning indicia. The bracket is secured to the panel 2 by a screw 44 which is received through a clearance hole in the mounting foot 42a of bracket 42 and threadably engages a hole provided in the panel 2. If desired, a tamper-proof type fastening means such as a one-way screw or the like may be substituted for screw 44, thereby requiring a special tool available only to the authorized workman for removal of the bracket. However, the requirement for special tools places an added burden on the authorized workman by requiring him to carry an additional tool for a particular manufacturer's panelboard. The length of the forward leg 42b of the hold-down bracket 42 is made to extend only across two breakers 32 as opposed to all three breakers inasmuch as the same bracket can thereby be used to retain a two-pole main breaker as is utilized for a single phase panelboard. Inasmuch as all three poles 32 of the main breaker 30 shown in the drawings are physically secured together, the bracket 42 provides satisfactory retention thereof by only overlying two poles of the breaker. The location of the bracket and its indicia are intended to render the bracket and its function plainly evident to alert the unauthorized person of potential danger.

The panelboard is provided with a suitable front cover 46 which has a pair of longitudinally extending, side-by-side rectangular openings 46a therein to accommodate the handle portions of the mounted circuit breakers. The forward horizontal leg 42b of the hold-down bracket 42 extends over the main breaker 30 and is in view within one rectangular opening 46a of the cover plate. As seen in FIG. 1, the rectangular opening 46a for the right-hand row of circuit breakers is notched out along its upper edge to accommodate the hold-down bracket 42.

It is to be appreciated from the foregoing description that while the simple and economically feasible hold-down bracket 42 is in position, it is impossible to remove the main circuit breaker 30 by a mere unplugging action. A tool is required to remove the screw 44 to permit removal of the hold-down bracket 42 before removing the main breaker 30 from the panelboard. While the hold-down bracket disclosed herein represents a preferred form of the invention, it is to be understood that the hold-down bracket is susceptible to various modifications without departing from the scope of the appended claims.

We claim:

1. In an electrical panelboard having a plurality of plug-in circuit breakers, the combination comprising:
   a panel;
   a mounting rail on said panel for mounting one end of said circuit breakers;
   insulating means mounted on said panel;
   a plurality of bus bars supported by said insulating means, said bus bars being transversely spaced with respect to said mounting rail extending along said panel parallel to said mounting rail and said bus bars having first plug-in connector means spaced at intervals along their length;
   a multi-pole main circuit breaker having a plurality of second plug-in connector means cooperably engagable with respective ones of said first plug-in connector means, one end of said multi-pole main circuit breaker being mounted to said mounting rail and said second plug-in connector means being engaged with respective ones of said first plug-in connector means, said main circuit breaker having wire receiving terminals for connecting said main circuit breaker to a source of electrical power; and
   hold-down means secured to said panel and extending forwardly from said panel along a side of said main circuit breaker and overlying said main circuit breaker transversely of a line extending between said plug-in connector means and said mounting rail for preventing removal of said main circuit breaker to thereby disconnect said first and second plug-in connections.

2. The electrical panelboard of claim 1 wherein said hold-down means comprises a bracket extending forwardly from said panel along a side of said main circuit breaker, said bracket having means provided at the free end thereof for overlying a portion of said main circuit breaker.

3. The electrical panelboard of claim 2 wherein said means provided at the free end of said bracket comprises an offset leg extending substantially parallel to said panel and overlying a forward surface of said main circuit breaker.

4. The electrical panelboard of claim 3 wherein said offset leg extends across the width of two poles of said multi-pole main circuit breaker.

5. The electrical panelboard of claim 4 wherein said offset leg overlies the forward surface of said main breaker adjacent an operating handle of said main circuit breaker.

6. The electrical panelboard of claim 5 wherein said offset leg is provided with indicia on its front face descriptive of the function of said bracket.

7. The electrical panelboard of claim 2 wherein said hold-down means further comprises removable fastening means for securing said bracket to said panel, said fastening means comprising tool engagement means thereon which are inadequate for operable engagement by human fingers.

8. The electrical panelboard of claim 7 wherein said tool engagement means further comprises a structural means for operable engagement solely by a specially formed tool for rendering said fastening means tamperproof.

9. The electrical panelboard of claim 2 wherein said bracket is Z-shaped having a first horizontal leg secured to said panel, a second horizontal leg overlying said portion of said main circuit breaker and a connecting leg between said first and second horizontal legs extending forwardly along a side of said main circuit breaker.

10. The electrical panelboard of claim 9 wherein said bracket is molded of electrical insulating material.

* * * * *